C. KNAUF.
MAP DISPLAYING APPARATUS.
APPLICATION FILED JULY 12, 1913.

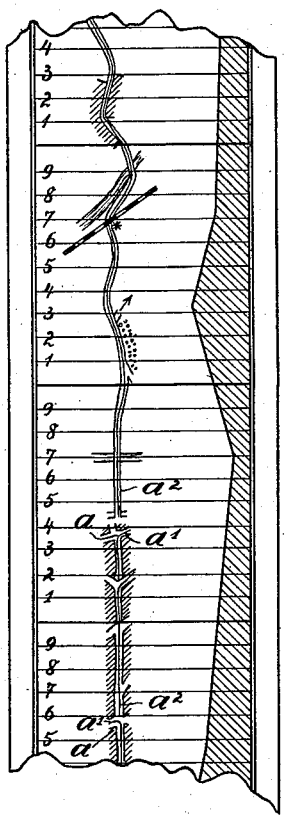
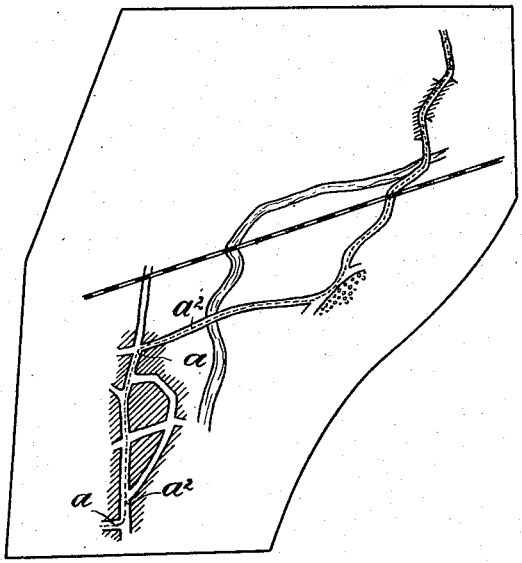

1,218,277.

Patented Mar. 6, 1917.
2 SHEETS—SHEET 2.

Witnesses:

Carl Knauf.
Inventor

UNITED STATES PATENT OFFICE.

CARL KNAUF, OF KRONACH, GERMANY.

MAP-DISPLAYING APPARATUS.

1,218,277.             Specification of Letters Patent.        Patented Mar. 6, 1917.

Application filed July 12, 1913.   Serial No. 778,773.

*To all whom it may concern:*

Be it known that I, CARL KNAUF, a citizen of the German Empire, and residing at Kronach, Bavaria, Germany, have invented a certain new and useful Improved Map-Displaying Apparatus, of which the following is a specification.

My invention relates to automatic topographical indicators for exhibiting the routes to be taken by road vehicles, particularly motor-cars.

According to the invention the maps are automatically mechanically fed behind an aperture, are divided into separate sheets or leaves which are located in a pile and are piled up again after being exhibited.

The leaves showing a predetermined route preferably have the same route illustrated in the reverse direction on their backs.

The employment of individual leaves according to the invention has the advantage that any desired routes and circular tours can be made up from them, and it is not necessary to carry a number of rolls and frequently unwind and wind them up in order to utilize short sections of the route from the one or the other roll.

Also, after traveling along a route it is not necessary to wind up the entire strip before the return journey, but by simply reversing the entire pile of leaves and using the maps on the back of the leaves the return journey can at once be made along the same road.

One illustrative embodiment of my invention is represented by way of example in the accompanying drawings, wherein:—

Figure 1 shows a portion of a map in the form of a strip or band,

Fig. 2 shows by way of comparison the portion of an ordinary map which corresponds to the route according to Fig. 1, individual parts of this route being designated by the same reference letters as in the strip shown in Fig. 1;

In my exhibiting device I employ maps originally in the form of bands, each of which shows only one route, *e. g.* Berlin to Munich, in known manner. A vertical section through the route is preferably shown in known manner at the edge of the road map parallel with the route proper. Further, the entire map is divided in known manner by transverse lines into kilometer or 100 meter sections. Preferably, the maps are printed on thin board on both sides thereof, *i. e* the route Berlin to Munich for example being on the one side and the same route but in the opposite direction, *i. e* Munich to Berlin, on the back.

According to my invention I divide the maps into separate leaves, in order to be able to begin the tours at any desired places, and to arrange the routes as desired. The individual parts or leaves of equal length may measure say 20 cms. long, which would correspond to a distance of 20 kilometers with a scale of 1:100,000. In order more readily to arrange the tours the individual maps are provided with a small plan having numbers of the routes. When not in use the maps will preferably be kept in a box or register.

Figure 3:
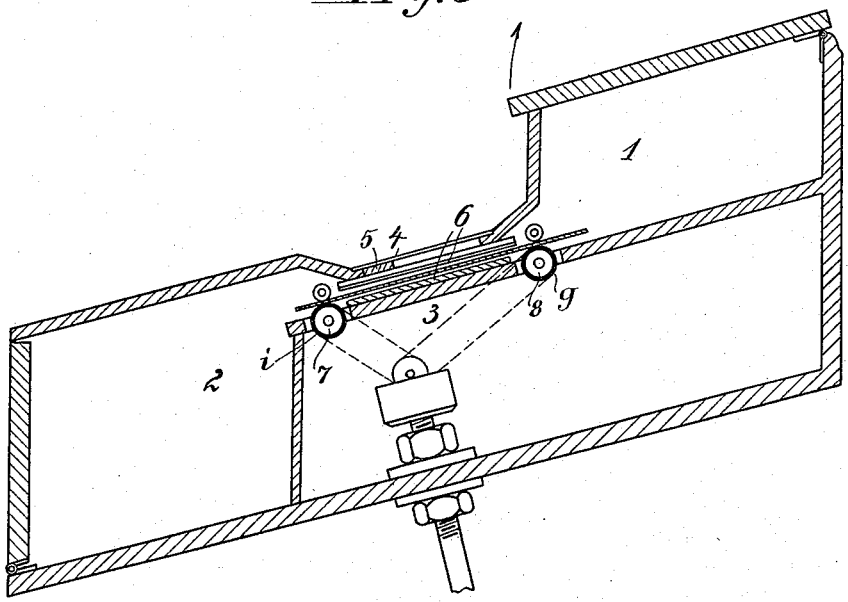
Fig. 3 is a sectional elevation showing the exhibiting device itself.

The device for exhibiting the maps comprises a box 1 for the leaves previously arranged in a pile. A second box 2 receives the leaves after they have passed through the device. Between these two boxes is a space or chamber 3 which is covered above by a pane of glass 4, through which a portion of a map can be seen by the driver. Over the visible portion of a map is a pointer 5 which indicates the exact place on the map where the vehicle is located for the time being, and consequently the direction to be taken. This pointer is arranged slidable or the like so that it can be adjusted from the outside in order to be able to correct small deviations. The maps are passed under the pane of glass at a speed corresponding to that of the vehicle. They are driven by rollers 7, 8 which are rotated by a device similar to those comprised in known kilometer counters or as in speed indicators. The feed rolls are preferably made like the platen rolls of typewriters and are provided with india rubber sleeves as shown at $i$ and $g$ in Fig. 3. For avoiding lateral displacement and for assuring the maps being guided exactly by the rollers guides 6 may be provided.

In order to introduce the individaul maps one after another between the feed rolls a device is used similar to the feed mechanism of automatic machines for railway tickets.

Figure 4:
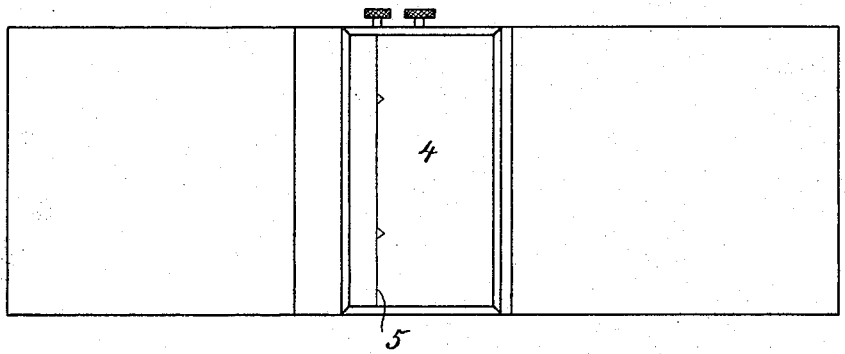
Fig. 4 is a top plan view of the device according to Fig. 3.

The various cars are fed from the pile in receptacle 1 by means, for example, of an oscillating arm $n$ having a spring-pressed pivoted nose thereon adapted to engage the cards successively, the arm being rocked by a connecting rod from the roller 8. The feed rolls are arranged to be moved from the outside by the knobs shown in Fig. 4 in order, for example, when the starting point of the journey is located in the middle of one of these maps, to be able to adjust the map to this point, as also when a route branching off from the main route is to be used and this branch route is not located just at the end of a map, so that the route which is not to be traveled along can be rapidly passed through the exhibiting device. The exhibiting device may be arranged to the left near the steering wheel in order that the driver may always have it well in sight.

I claim:—

1. In apparatus for indicating the route taken by road vehicles the combination of a casing, an aperture in said casing, a plurality of leaves constituting consecutive sections of a map and arranged in a pile in said casing, and means for feeding said leaves forward successively each leaf being moved continuously as it passes said aperture.

2. In apparatus for indicating the route taken by road vehicles the combination of a casing, an aperture in said casing, a plurality of leaves constituting consecutive sections of a map and arranged in a pile in said casing, means for feeding said leaves forward successively each leaf being moved continuously as it passes said aperture, and a stationary pointer arranged adjacent said aperture over the moving leaves.

3. In apparatus for indicating the route taken by road vehicles the combination of a casing, an aperture in said casing, a plurality of leaves constituting consecutive sections of a map and arranged in a pile in said casing, said leaves bearing on their undersides a reversed representation of the map which is on the top sides, and means for feeding said leaves forward successively each leaf being moved continuously as it passes said aperture.

4. In apparatus for indicating the route taken by road vehicles the combination of a casing having two chambers, an aperture in said casing arranged between said two chambers, a plurality of leaves constituting consecutive sections of a map and arranged in a pile in one of said chambers, and means for feeding said leaves forward successively from said latter chamber to the other chamber each leaf being moved continuously as it passes said aperture.

In testimony whereof, I affix my signature in the presence of two witnesses.

CARL KNAUF.

Witnesses:
 MIRTEN SCHULEERTH,
 I. HINZE.

Copies of this patent may be obtained for five cents each, by addressing the "Commissioner of Patents, Washington, D. C."